G. E. PERRY.
TIME STAMP.
APPLICATION FILED APR. 22, 1905.
920,174.
Patented May 4, 1909.
3 SHEETS—SHEET 1.
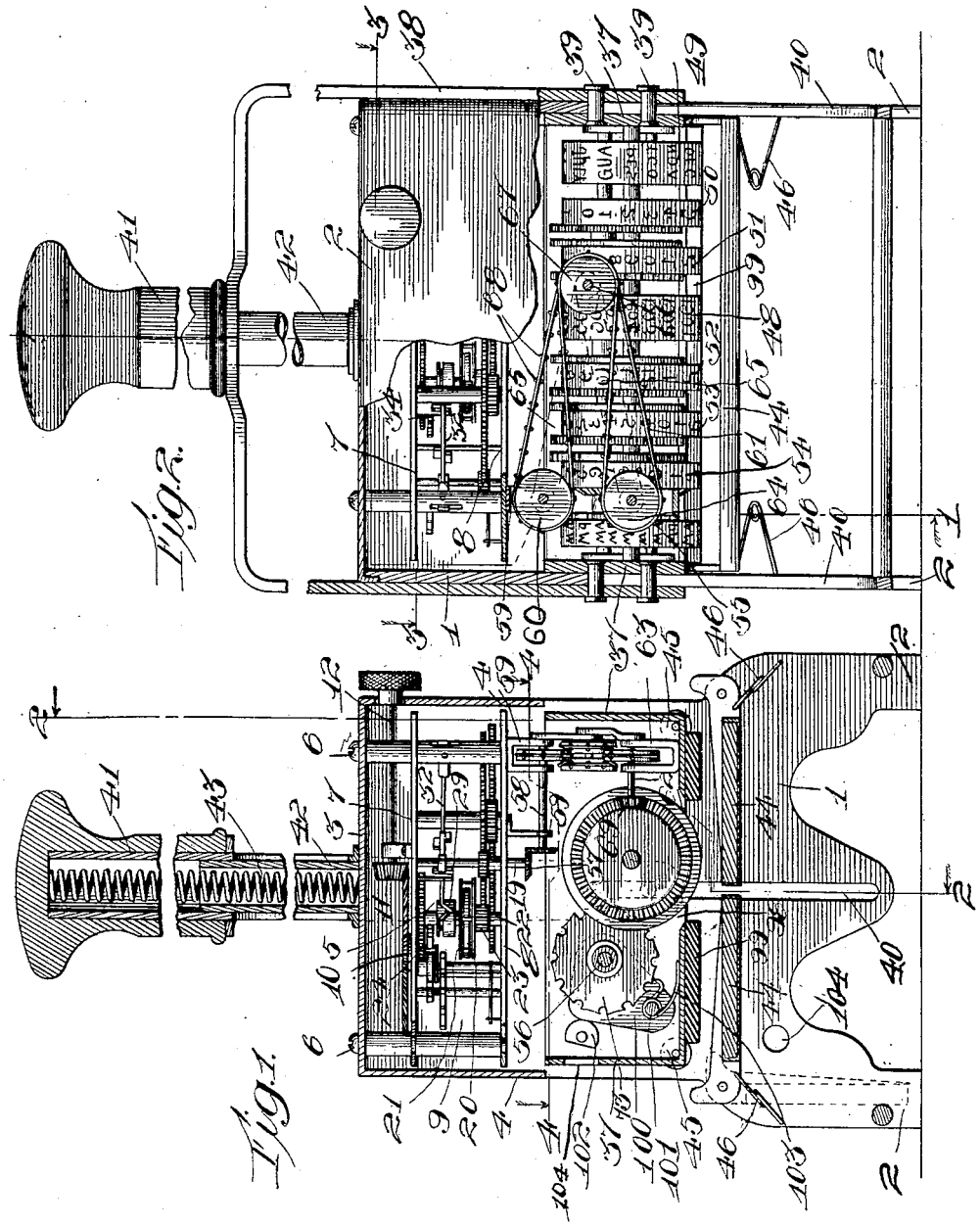

G. E. PERRY.
TIME STAMP.
APPLICATION FILED APR. 22, 1905.

920,174.

Patented May 4, 1909.
3 SHEETS—SHEET 2.

Witnesses:
G. V. Domarus.
W. Perry Hahn.

Inventor:
George Elliot Perry
by Jones & Addington
Attorneys.

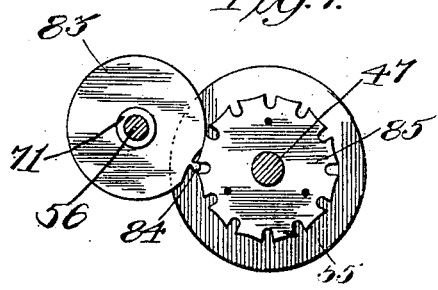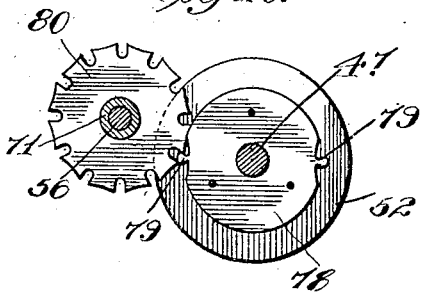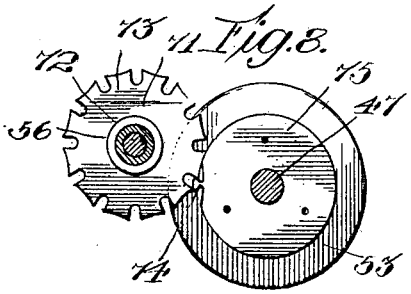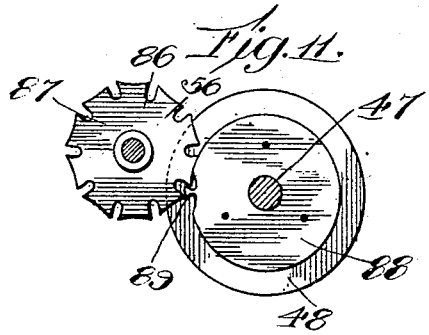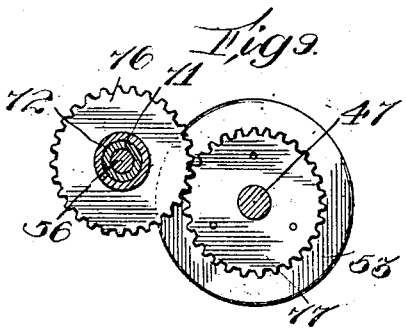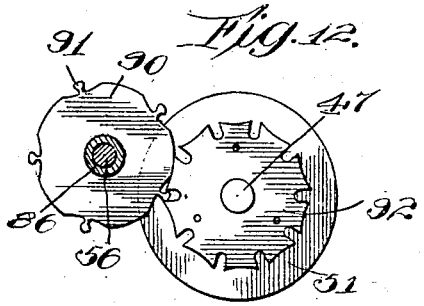

UNITED STATES PATENT OFFICE.

GEORGE ELLIOT PERRY, OF CHICAGO, ILLINOIS, ASSIGNOR TO STROMBERG ELECTRIC MFG. CO,

TIME-STAMP.

No. 920,174.   Specification of Letters Patent.   Patented May 4, 1909.

Application filed April 22, 1905. Serial No. 256,913.

*To all whom it may concern:*

Be it known that I, GEORGE ELLIOT PERRY, a citizen of the United States, residing at Chicago, in the county of Cook and State of Illinois, have invented new and useful Improvements in Time-Stamps, of which the following is a full, clear, concise, and exact description, reference being had to the accompanying drawing, forming a part of this specification.

My invention relates to time stamps, and has for one of its objects novel means for relatively and intermittently moving the time driven elements of the impression mechanism.

The other novel features of my invention will more clearly appear from the accompanying drawings, in which is illustrated one embodiment of my invention, which I have worked out for commercial purposes.

Figure 3:
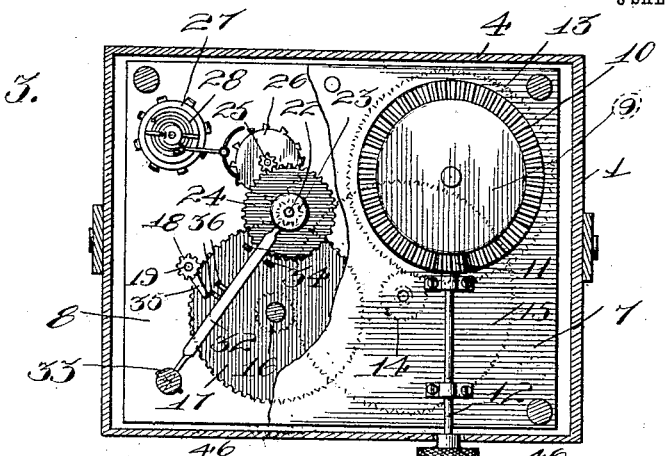
Figure 4:
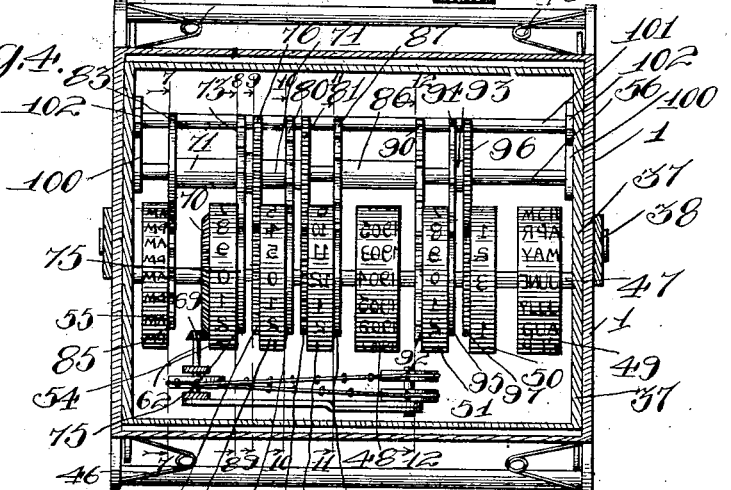
Figures 5, 6:
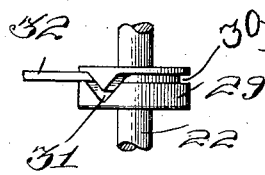

Figure 1 is a sectional view of my invention, taken on the line 1—1 of Fig. 2; Fig. 2 is a sectional view on the line 2—2 of Fig. 1; Fig. 3 is a view of the horologic motor mechanism, taken on the line 3—3 of Fig. 2; Fig. 4 is a view of the impression mechanism, taken on the line 4—4 of Fig. 1; Figs. 5 and 6 are detailed views of parts of the motor mechanism; and, Figs. 7 to 12, inclusive, are sectional views taken on the lines 7—7, 8—8, 9—9, 10—10, 11—11 and 12—12 respectively, of Fig. 4.

In the following description of the drawings, like reference numerals are used to designate like parts in the several figures.

In the form of my invention illustrated in the drawings, a casing is provided for the motor and impression mechanisms of the stamp, consisting of end-pieces or inclosing plates 1, 1, provided with suitable legs 2, 2, adapted to engage the surface of the article to be stamped, and a table 3 carried by the legs 1, 1, and having extended side walls adapted to inclose the stamp mechanism, as shown in Fig. 1. A horologic motor 5 is secured to the table 3, in any suitable manner, as by screws 6, 6, and is preferably mounted between supporting plates 7 and 8. A main spring 9, for actuating the motor mechanism, is adapted to be wound by the beveled gear 10, meshing with a small gear 11, carried upon the winding stem 12. A gear wheel 13, secured to the barrel, in which the main spring 9 is inclosed, is adapted to mesh with a small pinion 14, a large pinion 15 carried upon the arbor of the small pinion 14, is adapted to mesh with a small pinion 16, upon the arbor of which is mounted a large pinion 17, adapted to mesh with a small pinion 18, mounted upon the arbor 19, from which the movable elements of the impression mechanism are adapted to be intermittently driven, as will be hereinafter described.

The main spring 9 being of considerable strength, in order to readily move the members of the impression mechanism, a small sub-spring 20 inclosed with a casing 21, as shown in Fig. 1 is provided for operating the escapement of the motor mechanism. The casing is loosely mounted upon the arbor 22 and one end of the spring 20 is secured thereto, the opposite end thereof being secured to the arbor 22. Secured to the casing 21 is a small pinion 23, also loosely mounted upon the arbor 22 and adapted to mesh with the large pinion 17. Carried by the arbor 22 is a pinion 24, meshing with a small pinion 25, adapted to rotate with the wheel 26 of an escapement mechanism, including the usual balance wheel 27, and hair spring 28. The shaft 22 carries a bushing 29, having a peripheral cam-slot or groove 30 formed therein, and having a V-shaped depression 31, as shown in Figs. 5 and 6. An arm 32, is preferably pivoted in a post 33, disposed between the supporting plates 7 and 8, the free end of said arm being adapted to travel within the cam-slot 30, as the bushing 29 is rotated. An inverted U-shaped plate 34, disposed on either side of the rod 32, is secured to the supporting plate 7 and is adapted to retain the end of the rod 32, within the cam-slot 30. Carried upon the arbor 19 is a small finger 35, adapted to engage blocks or projections 36, 36, carried upon the arm 32, as shown in Figs. 3 and 6, to hold the driving arbor 19 against the power of the main spring 9. The blocks 36, 36, are disposed out of alinement upon the rod 32 to allow the finger 35 to escape from one to the other, as shown in Fig. 6.

In order that the type wheels or other movable impression elements of the impression mechanism may be stationary, when brought into contact with the surface to be impressed, and in order that said wheels may at all times occupy the proper relative positions for correctly recording time, it is necessary to move said type wheels or other movable elements quickly and intermittently. The operation of the motor mechanism, above described, for thus relatively and intermittently moving the time recording elements of the impression mechanism is as follows: The driving arbor 19 is prevented from being rotated by the power of the main spring 9 by the finger 35 and the blocks or projections 36, 36, carried by the arm 32. The sub-spring 20 is adapted to rotate the cam-block 29, preferably once every minute and the movement thereof is controlled by the clock escapement. As the arm 32 descends into the V-shaped slot 31 of said cam-block, the finger 35 is permitted to escape one of the projections 36 carried upon said rod, and as said rod travels out of said V-shaped slot, the finger 35 escapes the other block or projection 36 carried upon said rod, and the driving arbor 19 is moved one revolution by the pinion 17, meshing with the small gear 23, integrally connected with the casing 21 of the sub-spring 20, and winding said spring, sufficiently to operate the escapement mechanism and to rotate the shaft 22 carrying the cam-block 29, one revolution. It will thus be seen that the strong spring 9 is permitted to act directly in rotating the movable parts of the impression mechanism, the operation of said spring being controlled through the medium of the escapement mechanism, and the sub-spring 20, which in turn is actuated by the strong spring 9.

It will be understood that any suitable mechanism may be substituted for the particular means here shown, for obtaining the relative intermittent movement of the time recording elements through the medium of the powerful spring 9.

I prefer to mount the time recording elements of the impression mechanism within a casing 37, carried between the extended ends of a U-shaped plate or yoke 38, preferably by pins 39, 39, adapted to reciprocate within slots 40, 40, formed in the end plates 1, 1. A handle 41 is carried by said yoke, and is adapted to telescope with a tube 42, mounted upon the table 2, and containing a, preferably, coiled spring 43, against the power of which the stamp is operated to make an impression, and which returns the stamp to its normal position after an impression has been made.

Inking pads 44 are adapted to rest slightly out of engagement with the face of the impression mechanism, so as not to interfere with the free movement of the movable parts thereof, but in a position to permit said impression mechanism to be carried into engagement therewith after inking the face of the impression mechanism, are adapted to be carried by rollers 45, 45, mounted upon the casing 37, out of the path of the impression mechanism, as shown in dotted lines in Fig. 1. Springs 46, 46, having one end thereof secured to said pads, and the other end thereof secured to the plates 1, 1, are adapted to return the inking pads 44, 44, to their normal positions after an impression has been made.

Any suitable inking means may be substituted in lieu of the drop pads above described.

A plurality of type wheels are preferably used for indicating the year, month and day of the month, and the hour, minute, and the forenoon or afternoon of the day. All of said type wheels are loosely mounted upon a stationary shaft 47, mounted in the casing 37. The type wheel 48 is adapted to print the year, and the type wheel 49 is adapted to print the month, said wheels not having to be moved often are adapted to be moved by hand. The type wheel 50 is adapted to print the tens columns of the days and has upon its periphery the characters 1, 2, 3, and a blank space, 1, 2, 3, and another blank space, etc., the blank spaces corresponding to the size of the numerals. The type wheel 51 is adapted to print the units columns of the days and has upon its periphery the numerals 1, 2, 3, 4, 5, 6, 7, 8, 9, 0. The type wheel 52 is adapted to print the hour of the day and has upon its periphery the numerals 1 to 12, inclusive. The type wheel 53 is adapted to print the tens columns of the minute and has upon its periphery the numerals 1, 2, 3, 4, 5, 0, 1, 2, 3, 4, 5, 0. The type wheel 54 is adapted to print the units column of the minute and has upon its periphery the numerals 1, 2, 3, 4, 5, 6, 7, 8, 9, 0. The type wheel 55 is adapted to indicate the forenoon or afternoon of the day and has the characters A. M. and P. M., alternately arranged about the periphery thereof.

Mounted upon a stationary shaft 56, disposed between the ends of the casing 37, and arranged parallel with the shaft 47, is a plurality of loosely mounted sleeves, carrying a plurality of disks, to be hereafter described.

A beveled gear 57 is carried upon the end of the driving arbor 19 of the motor mechanism and is adapted to mesh with a beveled gear carried upon the end of the arbor 58, journaled in suitable plates 59, 59, secured to the supporting plate 8 of the motor mechanism. A small wheel 60, mounted upon the arbor 58, and having peripheral notches formed therein, is adapted to convey motion through the medium of suitable belt or conductor 61, to an arbor 62, journaled in a suitable supporting plate 63, secured to the casing 37, and carrying a similar wheel 64. Bars or links 65, 65, are loosely mounted upon the arbors 58 and 62, the opposite ends of said links being secured together by an arbor 66, upon which is mounted two small wheels 67, 67, adapted to be engaged by the belt or conductor 61. The belt or conductor 61, preferably consists of a piece of piano wire, upon which is soldered or otherwise suitably secured at regular intervals small nibs 68, 68, which are adapted to engage the correspondingly shaped peripheral notches formed in the wheels 60, 64 and 67. It will be seen that as the impression mechanism is moved relative to the motor mechanism, by the yoke 38, the wheels 60, 64 and 67, the links 65, 65, and the belt 61, will coöperate to maintain the motor mechanism in operative relation with the time driven elements of the impression mechanism.

The shaft 62 carries a small beveled gear 69, adapted to mesh with a large beveled gear 70, carried by the type wheel 54. Loosely mounted upon a sleeve 71 is a sleeve 72, carrying a disk 73, as shown in Fig. 8. A disk 75, is mounted integrally with the type wheel 54 and carries a projection or tooth 74, adapted to engage suitably shaped depressions or pockets formed in the periphery of the disk 73, mounted upon the sleeve 72. Mounted integrally upon the opposite end of the sleeve 72 is a gear wheel 76, adapted to mesh with a gear wheel 77, integrally mounted upon the type wheel 53, for indicating the tens column of the minute. It will be seen that as the type wheel 54 for indicating the units column of the minute is rotated, the disk 75, carrying the projection or tooth 74, will rotate the disk 73 mounted upon the sleeve 72, one notch, at every revolution of the type wheel 54, the type wheel 53 being correspondingly rotated one notch by the gear wheel 76, mounted upon the sleeve 72, and meshing with the gear wheel 77, carried by said type wheel, as shown in Fig. 9.

Mounted integrally with the type wheel 53 for indicating the tens column of the minute, is a disk 78, carrying a pair of diametrically oppositely disposed teeth 79, 79, adapted to engage suitable pockets formed in a disk 80 carried upon the sleeve 71, mounted upon the shaft 56, as shown in Fig. 10. A gear wheel 81 is also mounted upon the sleeve 71 and is adapted to mesh with a gear wheel 82, integrally mounted with the type wheel 52 for indicating the hour, said gear wheels being similar to the gear wheels shown in Fig. 9. Integrally mounted upon the opposite end of the sleeve 71 is a disk 83, (see Fig. 7) having a single pin or tooth 84 formed in its periphery, adapted to engage suitable pockets formed in the periphery of a disk 85, integrally mounted upon the type wheel 55, as shown in Fig. 4.

It will be seen that as the type wheel 53 for indicating the tens column of the minute is moved step by step or notch by notch, as above described, bringing the characters thereon into successive and relative printing position with the characters upon the type wheel 54 for indicating the units of the minute, the disk 78, secured to the type wheel 53, will move the disk 80, carried by the sleeve 71, one notch at every half revolution of the type wheel 53. The gear wheel 81 also carried by the sleeve 71 and meshing with the gear wheel 82, carried by the type wheel 52, for indicating the hour, will move said wheel 52 one notch. As the loosely mounted sleeve 71 is rotated by the disks 78 and 80, as above described, the disk 83 carried upon the opposite end of said sleeve and carrying a single tooth 84, as shown in Fig. 7, will rotate the type wheel 55, one notch at every revolution of the sleeve 71, through the medium of the disk 83, and the disk 85 integrally secured to said type wheel, which indicates the forenoon and afternoon of the day. Loosely mounted upon the shaft 56 is a sleeve 86, carrying upon one end thereof a disk 87, adapted to be engaged by a disk 88, as shown in Fig. 11, integrally secured to the type wheel 52, as shown in Fig. 4, and 88 having a single pin or tooth 89 formed therein, adapted to engage suitable pockets in the disk 87. Carried upon the opposite end of the sleeve 86 is a disk 90 having five peripheral pins or teeth 91, formed therein, as shown in Fig. 12, which are adapted to engage suitable pockets formed in the disk 92, integrally connected with the type wheel 51, for indicating the units column of the day. As the type wheel 52 for indicating the hour is relatively moved by the gear wheels 81 and 82, as above described, the disk 87 mounted upon the sleeve 86 is moved one notch at every revolution of the type wheel 52, by the disk 88 mounted integrally therewith. The disk 90 also carried by the sleeve 86 rides upon the concave surfaces of the disk 92 formed between the pockets therein, at each alternate movement of the disk 87, the disk 92 being moved by the peripheral pins 91, carried by the disk 90 at each alternate movement of the disk 87. Said pins, when engaging the pockets in the disk 92, moving the type wheel 51, for indicating the units of the days, one notch. It will be seen that as the disk 52 for indicating the hour is moved two revolutions, the disk 51 for indicating the units column of the day is moved one notch.

A small sleeve 93 is loosely mounted upon the shaft 56, said sleeve carrying a disk 94, having twelve peripheral notches or pockets adapted to be engaged by a tooth formed in the disk 95, integrally mounted with the type wheel 51 for indicating the units of the days, the disks 94 and 95 being similar to the disks 73 and 75, shown in Fig. 8. The sleeve 93 also carries a gear wheel 96, adapted to mesh with a gear wheel 97, integrally mounted upon the type wheel 50 for indicating the tens columns of the days. As the type wheel 51 is moved step by step, as above described, the disk 94 will be moved one step at each revolution of the type wheel 51, the type wheel 50 being moved one step or sufficiently to bring the next character thereon into printing position, at each movement of the disk 94, or each revolution of the type wheel 51, by means of the gear wheels 96 and 97.

It will be seen that the type wheels, loosely mounted upon the shaft 47, are relatively and intermittently moved by the horologic motor mechanism 5, through the medium of the disks and gear wheels integrally connected with said type wheels, and the disks and gear wheels loosely mounted upon the shaft 56. The type wheels are preferably formed with rubber peripheries, which permit the type wheels to accommodate themselves to any small unevenness in the surface to be stamped, said type wheels being adapted to extend through a longitudinal aperture 98, formed in the casing 37, said type wheels being adapted to aline with any additional stationarily mounted impression characters 99, preferably formed of rubber and adapted to be mounted upon the casing 37, as shown in Fig. 1. The shaft 56 is supported by plates 100, 100, said plates being pivoted in position by a shaft 101, secured to the sides of the casing 37, as shown in Fig. 1. The disks carried by the shaft 56 are held in engagement with the disks carried by the type wheels, by small buttons 102, 102, pivoted to the casing 37, said buttons having a flat side formed thereon, as shown in Fig. 1, said flat side of the buttons 102 being adapted to release the disks carried by the shaft 56 from engagement with the disks carried by the type wheels when said buttons are rotated, for the purpose of manually moving or setting the type wheels, a spring 103 being provided upon the shaft 101, engaging the supporting plates or links 100, in which the shaft 56 is journaled, said spring normally pressing the disks carried by the shaft 56 out of engagement with the disks carried by the type wheels. A suitable opening 104, is provided in the casing 1, adapted to afford access to the buttons 102, when the stamp mechanism is depressed, as shown in Fig. 1.

Throughout the description of my improved time stamp, I have referred to certain parts thereof which were not essential, and for which other constructions may be substituted, and I am aware that there are many other places, but not so designated, in the above description, to which said statement is applicable, and I do not wish to limit my invention to the arrangement and operation of the parts further than is defined in the appended claims.

Having described my invention what I claim as new and desire to secure by Letters Patent is:

1. In a portable time stamp, the combination with a relatively stationary frame having gage parts adapted to engage the surface to be impressed, a horologic motor carried by said frame, a reciprocating frame mounted on said stationary frame and movable between said gage parts, impression mechanism carried by said reciprocating frame and comprising type-wheels having the impression characters formed on the peripheries thereof, and an endless motion transmitting means for connecting said motor and said impression means.

2. In a portable time stamp, the combination with a relatively stationary frame having gage parts adapted to engage the surface to be impressed, a horologic motor carried by said frame, a reciprocating frame mounted on said stationary frame and moving between said gage parts, impression mechanism carried by said movable frame and comprising type-wheels having impression characters formed on the peripheries thereof, an endless motion transmitting means for connecting said impression mechanism and said motor, and means for inking said type-wheels without interfering with the direct engagement thereof with the surface to be impressed.

3. In a portable time stamp, comprising in a self-contained unitary structure, the combination with a supporting frame, of a spring-actuated, escapement motor mechanism mounted thereon, an impression mechanism movable relatively to said motor carried by said frame and comprising type wheels having impression characters formed on the peripheries thereof, and a driving belt connecting said motor mechanism and impression mechanism, which permits said impression mechanism to be moved relatively to said motor in making an impression without being disconnected therefrom.

4. In a portable time stamp, the combination with a relatively stationary frame having gage parts adapted to engage the surface to be impressed, a horologic motor carried by said frame, a reciprocating frame mounted on said stationary frame and moving between said gage parts, impression mechanism carried by said movable frame comprising type-wheels having impression characters formed on the peripheries thereof, a belt for continuously and operatively connecting said motor and said impression mechanism, and means for inking said type-wheels without interfering with the engagement thereof with the surface to be impressed.

5. In a portable time stamp, comprising in a self-contained unitary structure, the combination with a supporting frame, of a motor mechanism mounted thereon, an impression mechanism movable relatively to said motor carried by said frame and comprising type wheels having impression characters formed on the peripheries thereof, an endless motion transmitting means connecting said motor and impression mechanism which permits said impression mechanism to be moved relatively to said motor in making an impression without being disconnected therefrom, and inking pads normally out of engagement with said impression mechanism for inking the same between the impressions.

6. In a portable time stamp, the combination with a relatively stationary frame having gage parts adapted to engage the surface to be impressed, a horologic motor carried by said frame, a reciprocating frame mounted on said stationary frame and moving between said gage parts, impression mechanism carried by said movable frame and comprising type-wheels having impression characters formed on the peripheries thereof, a belt for continuously and operatively connecting said impression mechanism with said motor, and inking pads normally out of engagement with said impression mechanism for inking the same between the impressions.

7. A portable time stamp adapted to be used without a platinum, comprising in a self-contained unitary structure, the combination with a supporting frame, of a spring-actuated escapement, motor mechanism mounted thereon, an impression mechanism movable relatively to said motor carried by said frame and comprising type wheels having impression characters formed on the peripheries thereof adapted to directly engage the surface to be impressed, an endless motion transmitting means connecting said motor and impression mechanism, which permits said impression mechanism to be moved relatively to said motor in making an impression without being disconnected therefrom, and a pad for inking said impression mechanism arranged to be moved out of the path of the impression mechanism when the stamp is operated to make an impression.

8. In a portable time stamp, the combination with a relatively stationary frame having gage parts adapted to engage the surface to be impressed, a motor mechanism mounted on said frame and comprising a spring, a continuously operating motor and means controlled by said motor for intermittently releasing said spring, a reciprocating frame carried on said stationary frame and movable between said gage parts, impression mechanism carried on said reciprocating frame, and an endless motion transmitting means for connecting said impression mechanism with said motor mechanism.

9. In a portable time stamp, the combination with a relatively stationary frame having gage parts adapted to engage the surface to be impressed, of a motor mechanism mounted on said frame and comprising a relatively powerful operating spring, a relatively weak controlling spring and means controlled by said weak spring for intermittently releasing said operating spring, a reciprocating frame mounted on said stationary frame and movable between said gage parts, impression mechanism carried by said movable frame, and means for continuously and operatively connecting said impression mechanism with said motor mechanism.

10. In a portable time stamp, the combination with a relatively stationary frame having gage parts adapted to engage the surface to be impressed, of a motor mechanism mounted on said frame and comprising a spring, a continuously running motor and means controlled by said motor for intermittently releasing said spring, a reciprocating frame mounted on said stationary frame and movable between said gage parts, impression mechanism carried by said reciprocating frame, and a belt for continuously and operatively connecting said impression mechanism with the motor mechanism.

In witness whereof, I have hereunto subscribed my name in the presence of two witnesses.

GEORGE ELLIOT PERRY.

Witnesses:
C. B. CAMP,
W. PERRY HAHN.